United States Patent [19]

Suzuki

[11] Patent Number: 4,752,845
[45] Date of Patent: Jun. 21, 1988

[54] POSITIVE MOTION CAM MECHANISM FOR PERFORMING TAPE LOADING FUNCTIONS IN CASSETTE TAPE RECORDER

[75] Inventor: Shoji Suzuki, Iwaki, Japan
[73] Assignee: Alpine Electronics, Inc., Japan
[21] Appl. No.: 846,571
[22] Filed: Mar. 31, 1986
[30] Foreign Application Priority Data
Mar. 30, 1985 [JP] Japan .............................. 60-47174[U]
[51] Int. Cl.$^4$ .................... G11B 15/61; G11B 15/665; G11B 15/675
[52] U.S. Cl. ........................................ 360/95; 360/85; 360/96.5
[58] Field of Search ....................... 360/96.5, 96.6, 85, 360/95

[56] References Cited
U.S. PATENT DOCUMENTS

| | | | |
|---|---|---|---|
| 4,388,658 | 6/1983 | Kajino et al. | 360/85 |
| 4,408,236 | 10/1983 | Murata et al. | 360/95 |
| 4,562,496 | 12/1985 | Saito et al. | 360/85 |
| 4,611,251 | 9/1986 | Yokoo | 360/85 |

Primary Examiner—Robert S. Tupper
Attorney, Agent, or Firm—Guy W. Shoup

[57] ABSTRACT

A driving mechanism of a cassette tape recorder, for inserting and ejecting a tape cassette and loading and unloading the tape of an inserted tape cassette. The driving mechanism comprises a positive motion cam having a cam groove consisting of two grooves having the shapes of circular arcs of different radiuses and different arc lengths, respectively, and a connecting groove interconnecting the two grooves, two followers suitably associated with the positive motion cam, two lever systems operatively interlocked with the two followers, respectively, and a single reversible motor interlocked with the positive motion cam. The operation of the reversible motor in the normal direction achieves a tape cassette inserting operation and a tape loading operation sequentially through the positive motion cam and the two lever systems. The operation of the reversible motor in the reverse direction achieves a tape unloading operation and a tape cassette ejecting operation sequentially through the same positive motion cam and the same lever systems.

1 Claim, 12 Drawing Sheets ered to "VTR" hereinafter), loading and unloading a cassette are carried out through electrical means, such as an electric motor, while engaging and disengaging the pinch roller and the capstan for recording and reproducing are carried out through mechanical means, such as a lever system interlocked with a control button. Such a control button, however, cannot be lightly operated.

POSITIVE MOTION CAM MECHANISM FOR PERFORMING TAPE LOADING FUNCTIONS IN CASSETTE TAPE RECORDER

BACKGROUND OF THE INVENTION

1. Field of the Invention:

The present invention relates to a driving mechanism for driving two members of a cassette tape recorder with a single power means for loading and unloading a cassette and for engaging and disengaging the pinch roller and the capstan of the cassette tape recorder.

2. Description of the Prior Art:

In a conventional cassette video tape recorder (abbreviated to "VTR" hereinafter), loading and unloading a cassette are carried out through electrical means, such as an electric motor, while engaging and disengaging the pinch roller and the capstan for recording and reproducing are carried out through mechanical means, such as a lever system interlocked with a control button. Such a control button, however, cannot be lightly operated.

In order to improve the accessibility of the conventional VTR, a driving mechanism which engages or disengages the pinch roller and the capstan also through electrical means, such as a small motor or a solenoid, has been proposed.

However, such a VTR in which the pinch roller and the capstan are engaged or disengaged electrically needs another power means in addition to a loading motor, which increases the size and cost of the VTR. Furthermore, in such a conventional VTR, the pinch roller must be pressed against the capstan after the completion of the loading operation or the unloading operation must be started after the separation of the pinch roller from the capstan, which requires a separate control unit for suitably and sequentially controlling those operations, and hence the size of the VTR is further enlarged.

SUMMARY OF THE INVENTION

The present invention has been made in view of the above-mentioned problems of the conventional VTR.

Accordingly, it is an object of the present invention to provide a driving mechanism for driving two members of a VTR, having only a single motor, capable of achieving both an operation for loading and unloading a cassette and an operation for engaging and disengaging the pinch roller and the capstan, and capable of providing a compact, lightweight and inexpensive VTR.

The object of the present invention is achieved by a driving mechanism comprising: a plate cam as a driver having a cam groove consisting of two grooves having the shapes of circular arcs of different radiuses with the centers at the axis of rotation of the plate cam, respectively, and a connecting groove interconnecting those two grooves; two followers interlocked with the driver; the lengths of the two grooves having the shapes of circular arcs being decided so that one of the followers engage the connecting groove while the other follower engages the groove having a greater radius than the other or the groove having a smaller radius than the other, and the former follower engages the groove having a greater radius than the other or the groove having a smaller radius than the other while the latter follower engages the connecting groove; said followers being operatively interlocked with individual members, respectively, and said driver being rotated with suitable power means.

The above and other objects, features and advantages of the present invention will become more apparent from the following description of the preferred embodiment thereof taken in conjunction with the accompanying drawings.

DESCRIPTION OF THE PREFERRED EMBODIMENT

The present invention will be described concretely hereinafter with reference to a preferred embodiment thereof in connection with the accompanying drawings.

Figure 14:
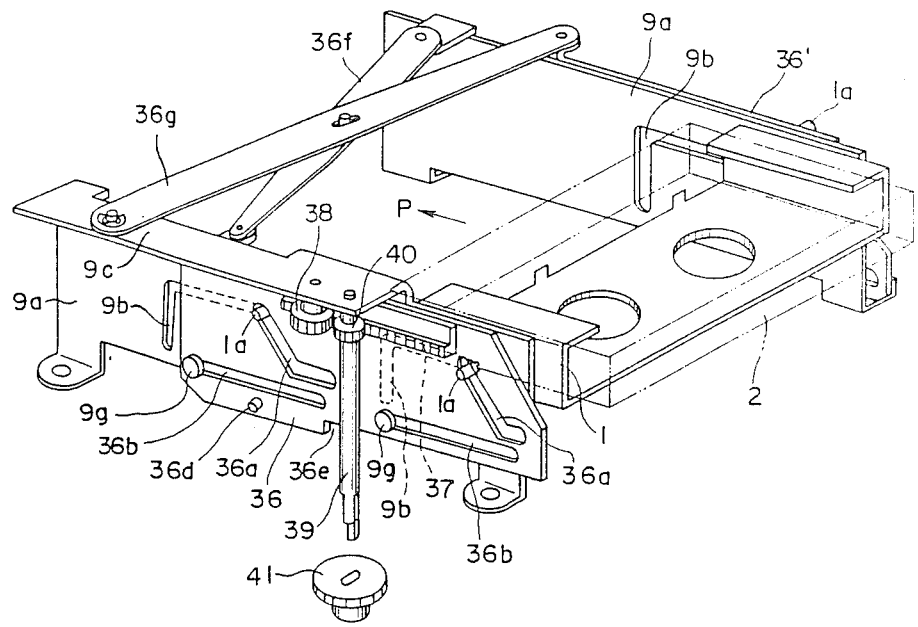
FIG. 14 is a perspective view of assistance in explaining the movement of a cassette holder.
Figure 15:
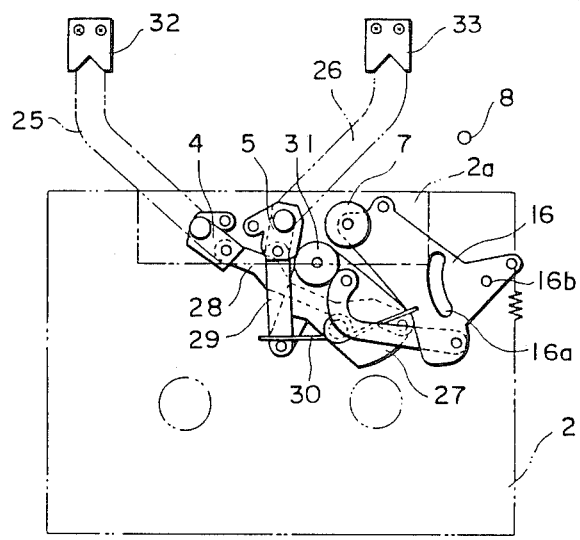
FIGS. 15 and 16 are views of assistance in explaining the manner of loading operation.
Figure 16:
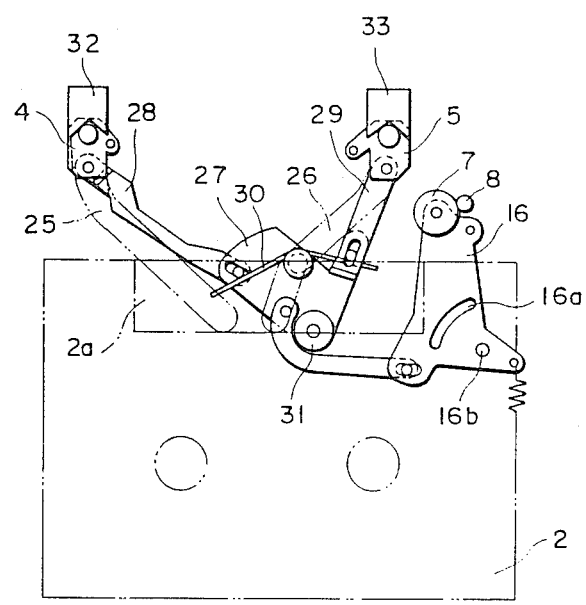

First, the movement of a cassetted holder 1 and loading operation will be described briefly with reference to FIGS. 14 to 16. Upon the operation of a control button, not shown, after the insertion of a tape cassetted 2 into a cassette holder 1, a reversible motor 3 (FIG. 1) is actuated to transfer the cassette holder 1 horizontally in a direction indicated by an arrow P (referred to as "P-direction" hereinafter) as illustrated in FIG. 14, and then to transfer the cassette holder 1 vertically downward after the cassette holder 1 has arrived at a suitable horizontal position. Thus the tape cassette 2 is loaded in the VTR. As illustrated in FIG. 15, loading blocks 4 and 5 located on the opening 2a of the tape cassette 2 are moved upward as viewed in FIG. 15 outside the opening 2a of the tape cassette 2 as the reversible motor 3 continues running, to pull out the tape 6 (FIG. 2) for loading. Then, a pinch roller 7 (FIG. 2) is moved to press the tape 6 to a capastan 8. Thus the VTR is ready for recording or reproducing.

The constitution and action of the loading mechanism will be described hereinafter.

Figure 2:
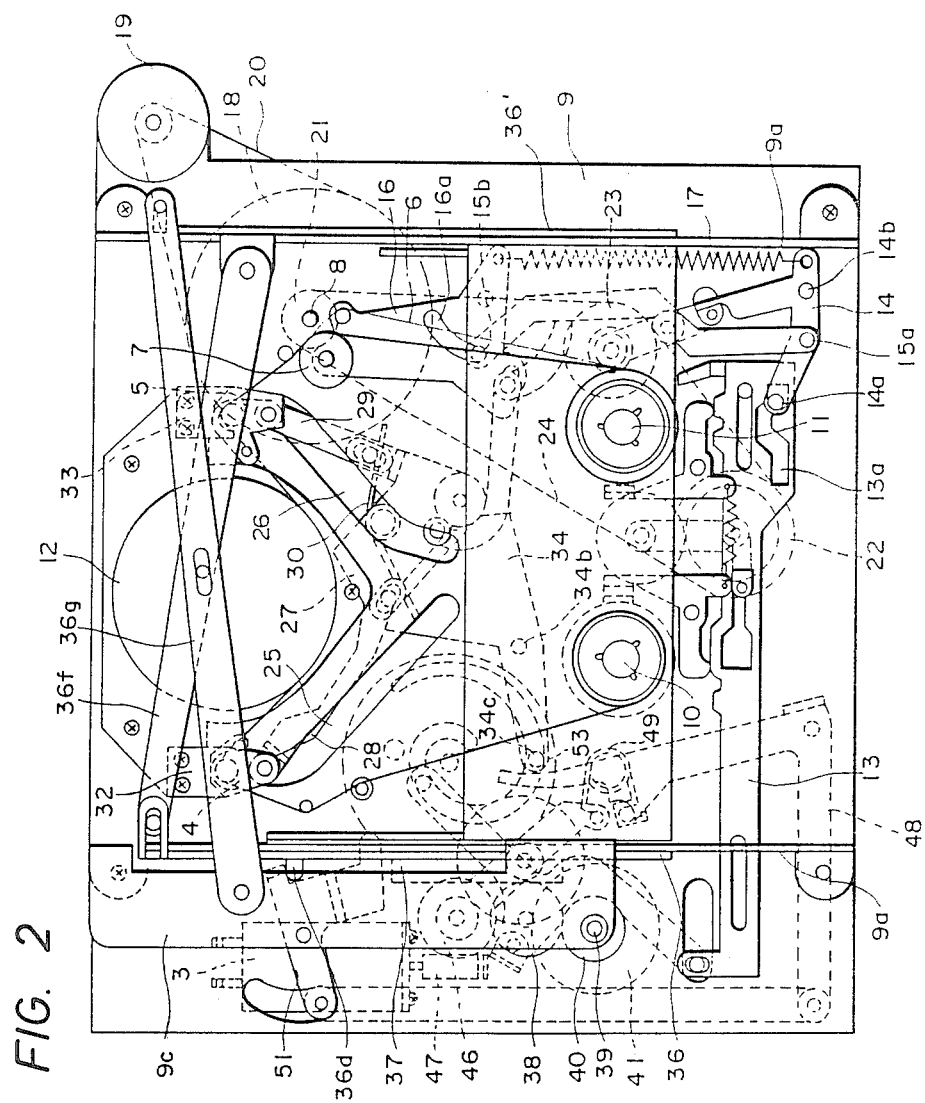
FIG. 2 is a plan view of the VTR of FIG. 1, in which the internal structure of the VTR is indicated by broken lines.
Figure 3:
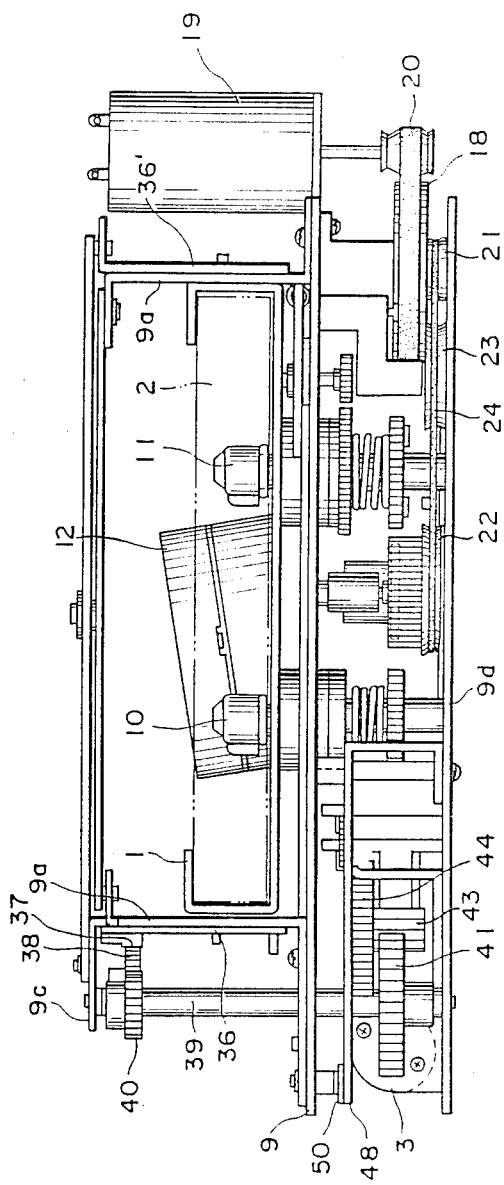
FIG. 3 is a front elevation of the VTR of FIG. 1.
Figure 4:
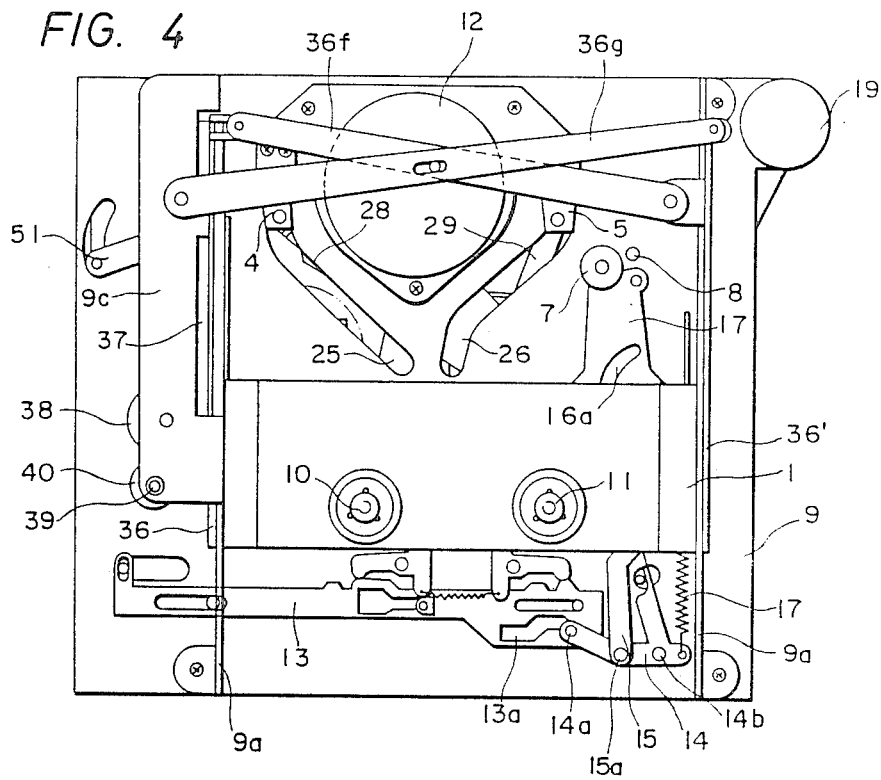
FIG. 4 is a plan view of the VTR of FIG. 1.
Figure 5:
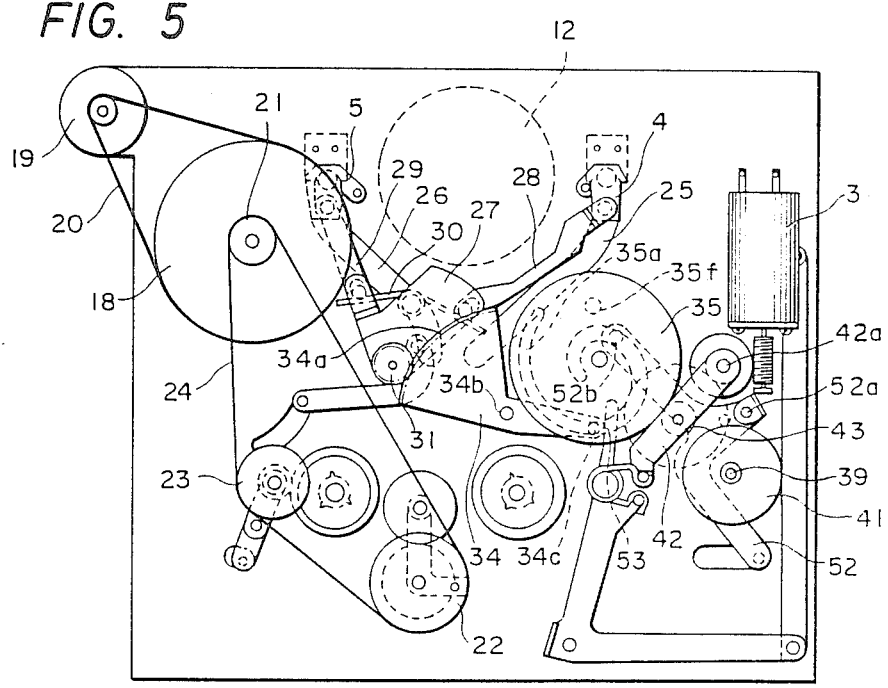
FIG. 5 is a bottom view of the VTR of FIG. 1, in which the subchassis is removed.
Figure 6:
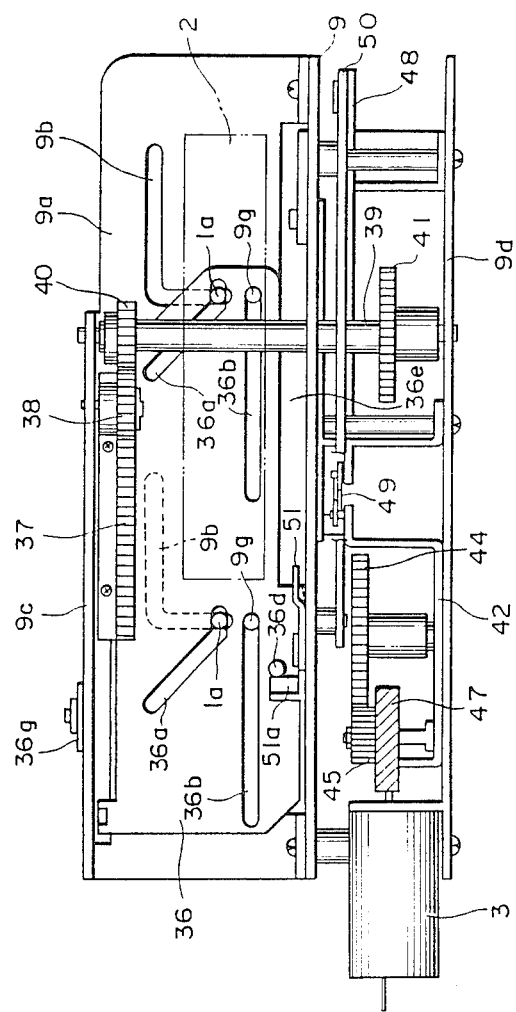
FIG. 6 is a left-hand side elevation of the VTR of FIG. 1.
Figure 7:
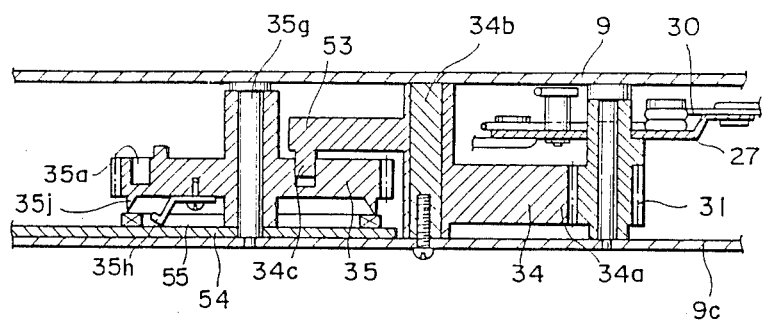
FIG. 7 is a sectional view showing the relation between a positive motion cam and a sector gear.
Figure 8:
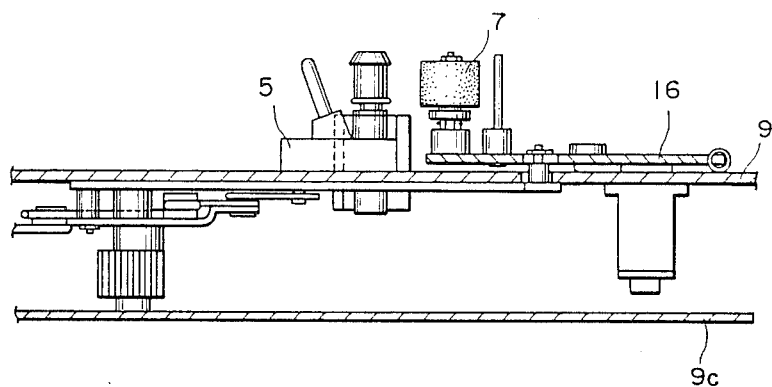
FIG. 8 is a sectional view showing the relation between a loading arm and a pinch roller supporting plate.
Figure 9:
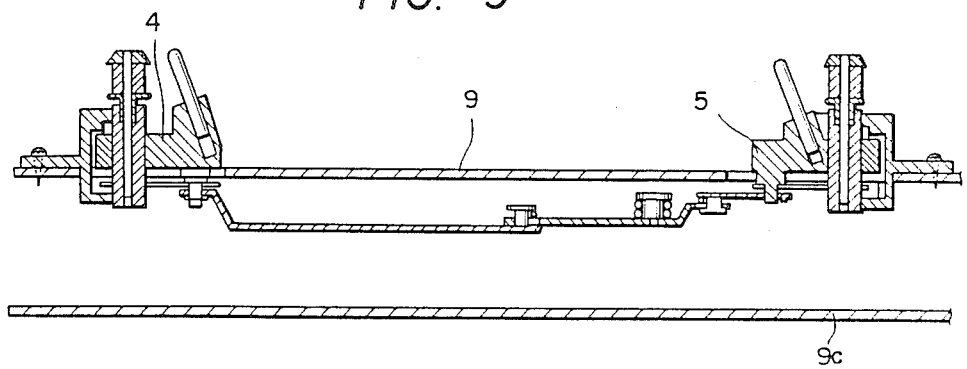
FIG. 9 is a sectional view showing the relation between loading blocks.

A supply reel shaft 10 and a winding reel shaft 11 for winding the tape 6 of the loaded tape cassette 2 are provided on a chassis 9. The tape 6 drawn out from the reel put on the supply reel shaft 10 is passed through the loading block 4, a rotary head drum 12, the loading block 5, the pinch roller 7 and the capstan 8 and is wound on the reel put on the winding reel shaft 11. In FIGS. 2 and 4, the tape 6 is stopped, and hence the pinch roller 7 is separated from the capstan 8.

Figure 19:
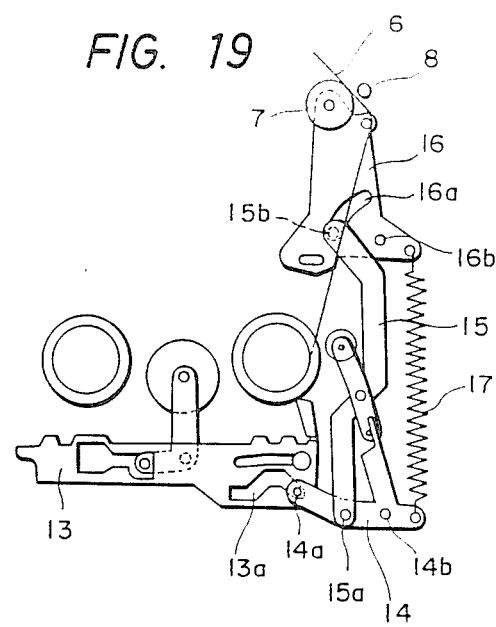
FIGS. 19 and 20 are plan views of assistance in explaining the relation between the pinch roller and the capstan of the VTR of FIG. 1.
Figure 20:
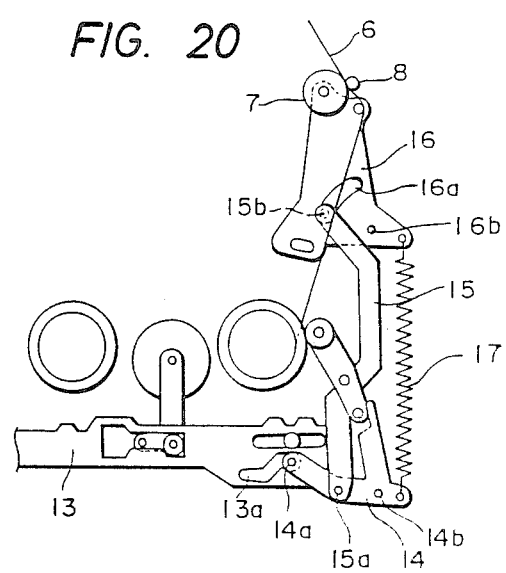

A control plate 13 is mounted laterally slidably, as viewed in FIGS. 2 and 4, on the chassis 9. A pin 14a attached to one end of a lever 14 is fitted in a cam slot 13a formed in the right-hand end of the control plate 13. A connecting plate 15 is pivotally joined to the central portion of the lever 14 with a pin 15a, while the lever 14 is pivotally joined to the chassis 9 with a pin 14b. A pin 15b attached to the free end of the connecting plate 15 is fitted in an arcuate slot 16a formed in a pinch roller supporting plate 16. The pinch roller 7 is supported rotatably on one end of the pinch roller supporting plate 16. A tension coil spring 17 is extended between the other end of the pinch roller supporting plate 16 and the other end of the lever 14. The pinch roller supporting plate 16 is joined rotatably to the chassis 9 with a pin 16b (in FIG. 19). Accordingly, when the control plate 13 slides rightward, as viewed in FIGS. 1, 2, 4, 13 and 19, the pin 14a is moved along the cam slot 13a to turn the lever 14 clockwise, and thereby the connecting plate 15 is raised. When the connecting plate 15 is raised, the pinch roller supporting plate 16 is released to allow the tension coil spring 17 to turn the pinch roller supporting plate 16 clockwise, whereby the tape 6 is pressed against the capstan 8.

A flywheel 18 is mounted on the shaft of the capstan 8. A belt 20 is extended between a pully attached to the output shaft of a capstan motor 19 and the flywheel 18 to rotate the capstan 8. A belt 24 is extended between a pulley 21 mounted on the shaft of the capstan 8, a driving pulley 22 rotatably supported on the chassis 9 and a driving pulley 23 to drive the supply reel shaft 10 and the winding reel shaft 11.

The loading blocks 4 and 5 are slidable along guide slots 25 and 26 formed in the chassis 9, respectively. An arm 27 is supported rotatably at the top thereof on the chassis 9. One end of a connecting arm 28 supporting the loading block 4 and one end of a connecting arm 29 supporting the loading block 5 are joined rotatably to one end and to the other end of the arm 27, respectively. A torsion coil spring 30 is provided practically at the central part of the arm 27 with the opposite ends thereof engaging the pins supporting the connecting arms 28 and 29, respectively. A third loading gear 31 is fixed to the arm 27. Stoppers 32 and 33 for stopping the loading blocks 4 and 5, respectively, are provided at the extremities of the guide slots 25 and 26, respectively.

A sector gear 34 having a second loading gear 34a is supported rotatably on the chassis 9 with a pin 34b. A pin 34c attached to the free end of an arm extending from the boss of the sector gear 34 as a driver is fitted in a cam groove 35a formed in a positive motion cam 35.

Figure 10:
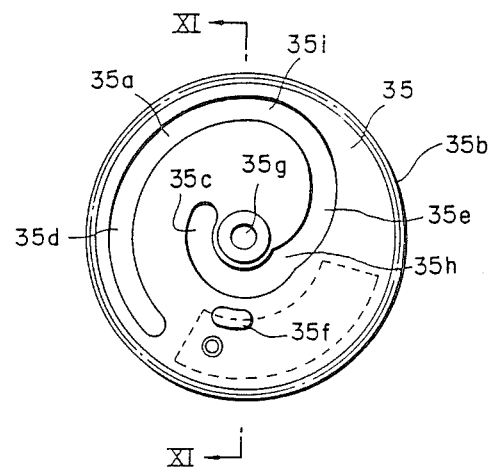
FIG. 10 a plan view of a positive motion cam.
Figure 11:
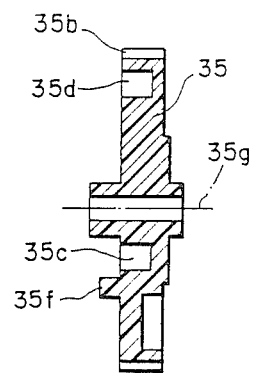
FIG. 11 is a sectional view taken along line XI—XI of FIG. 10.
Figure 12:
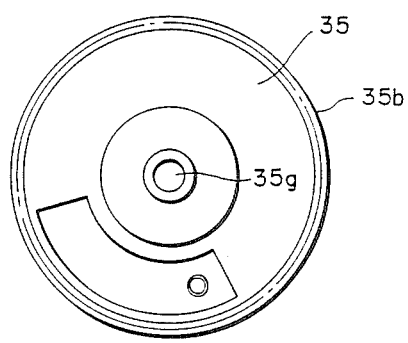
FIG. 12 is a bottom view of a positive motion cam.
Figure 13:
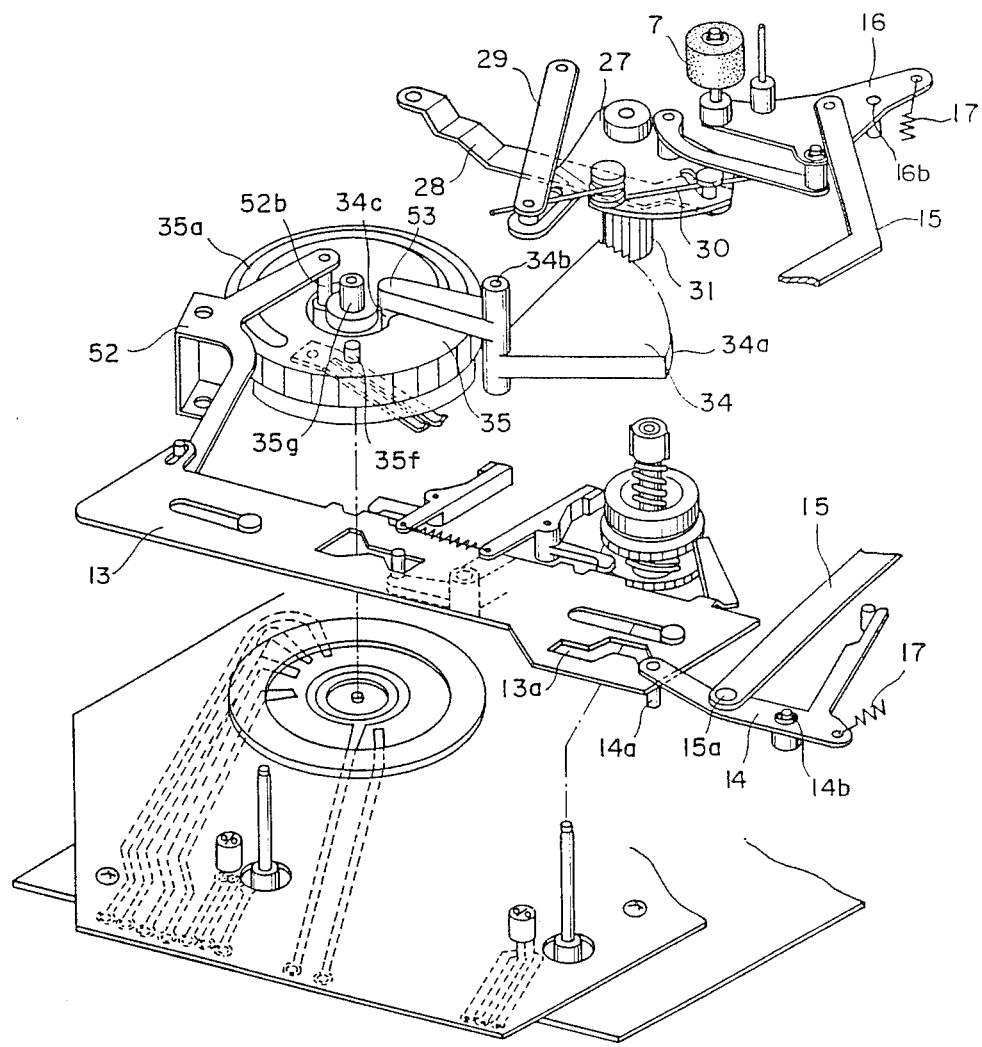
FIG. 13 is an exploded perspective view illustrating the constitution of the loading mechanism.

The disk-shaped position motion cam 35 is supported rotatably on the chassis 9 with a pin 35g. A first loading gear 35b is formed integrally with the positive motion cam 35. As illustrated in FIGS. 10 and 11, the positive motion cam 35 has a cam groove 35a consisting of an inner groove 35c having the shape of an arc of a circle having a smaller radius with its center at the center of the pin 35g and an appropriate length, an outer groove 35d having the shape of an arc of a circle having a larger radius with its center at the center of the pin 35g and an appropriate length, and a connecting grooves 35e connecting at junctions 35h and 35i to the inner groove 35c and the outer groove 35d, respectively. The pin 34c of the sector gear 34 is slidably fitted in the cam groove 35a so that the sector gear 34 functions as a follower. The positive motion cam 35 is provided with a stopper 35f projecting from the upper surface of the positive motion cam 35.

The first loading gear 35b, the positive motion cam 35, the sector gear 34, the second loading gear 34a, the third loading gear 31 and the arm 27 constitute a power transmission system for loading motion. The constitution of a power transmission system for transferring the cassette holder 1 will be described hereinafter.

As illustrated in FIG. 14, the cassette holder 1 is located between the upright side plates 9a of the chassis 9. Two pins 1a project from one side surface of the cassette holder 1, while one pin 1a projects from the other side surface of the same. The pins 1a are slidably fitted in substantially L-shaped slots 9b formed in the side plates 9a, respectively. Sliding plates 36 and 36' are provided so as to slide along the side plates 9a, respectively. The pins 1a of the cassette holder 1, extending through the L-shaped slots 9b are slidably fitted also in inclined slots 36a formed in the sliding plates 36 and 36', respectively. Pins 9c projecting from the side plates 9a are slidably fitted in elongate slots 36b formed in the sliding plates 36 and 36' to guide the sliding plates 36 and 36' for sliding motion, respectively. A rack 37, namely, a fourth cassette holder transfer gear, is attached to the sliding plate 36. Connecting arms 36f and 36g interlock the sliding plates 36 and 36' for coincident sliding motion. The connecting arm 36f is joined pivotally at one end thereof to the sliding plate 36 having the rack 37 and is joined pivotally at the other end thereof to the side plate 9a adjacent to the sliding plate 36'. The other connecting arm 36g is joined pivotally at one end thereof to the sliding plate 36' not having the rack 37 and is joined pivotally at the other end thereof to the side plate 9a adjacent to the sliding plate 36. A pin 36h attached to the practically middle part of the connecting arm 36f is fitted slidably and pivotally in a slot 36i formed in the practically middle portion of the other connecting arm 36g along the longitudinal direction of the connecting arm 36g.

A third cassette holder transfer gear 38 is supported rotatably on a flange 9c formed by bending the upper portion of the side plate 9a so as to engage the rack 37. A countershaft 39 is extended through the chassis 9 between the flange 9c and a subchassis 9d. A second cassette holder transfer gear 40 is fixed to the upper end of the countershaft 39 so as to engage the cassette holder transfer gear 38. A first cassette holder transfer gear 41 is fixed to the lower end of the countershaft 39 in level with the first loading gear 35b.

A swing arm 42 is supported pivotally at one end thereof on the chassis 9. A pinion 43 is supported rotatably practically at the middle of the swing arm 42. The pinion 43 is interposed between the first loading gear 35b and the first cassette holder transfer gear 41. The swing arm 42 is turned to make the pinion 43 engage either the first loading gear 35b or the first cassette holder transfer gear 41. An idle gear 44 is fixed to the shaft of the pinion 43, so that the pinion 43 and the idle gear 44 rotate synchronously. An idle pinion 45 engaging the idle gear 44, and a worm wheel 46 are fixed to the pivotal shaft 42a of the swing arm 42. The worm wheel 46 and a worm 7 fixed to the output shaft of the reversible motor 3 are engaged.

Figure 17:
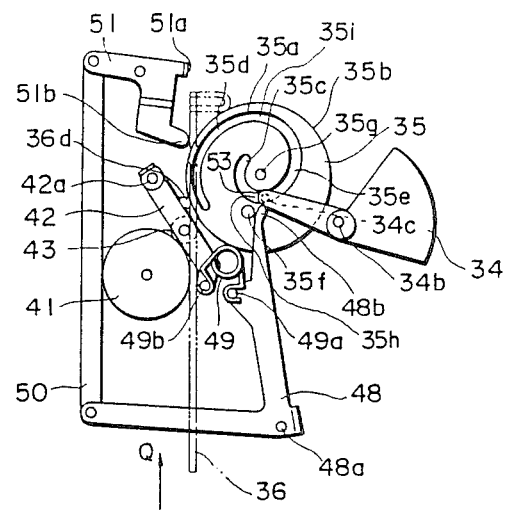
FIGS. 17 and 18 are plan views of assistance in explaining the action of an essential portion of the VTR of FIG. 1.

A substantially V-shaped reversing lever 48 is joined pivotally to the chassis 9 with a pin 48a at the bend thereof. A torsion coil spring 49 is loaded between part of the reversing lever 48 and the free end of the swing arm 42. The loading point 49a of the torsion coil spring 49 on the reversing lever 48 can be shifted to a position on the side of the first loading gear 35b and to a position on the side of the first cassette holder transfer gear 41 with respect to a line passing the loading point 49b of the torsion coil spring 49 on the swing arm 42 and the pivotal pin 42a of the swing arm 42. A finger 48b is formed in the reversing lever 48 on the side engaging the torsion coil spring 49 so as to engage the stopper 35f of the positive motion cam 35 or the free end of the arm supporting the pin 34c of the sector gear 34. When the finger 48b and the free end of the arm of the sector gear 34 are engaged as illustrated in FIG. 17, the sector gear 34 is unable to rotate.

A connecting plate 50 is joined rotatably at one end thereof to the other end of the reversing lever 48 and at the other end thereof to a stopping lever 51. The stopping lever 51 is supported pivotally on the chassis 9. A bent portion 51a is formed at one end of the stopping lever 51 so as to engage a projection 36d projecting from the sliding plate 36, while a projection 51b is formed in the other end of the stopping lever 51 so as to be fitted in a recess 36e formed by cutting a portion of the lower edge of the sliding plate 36.

A lever 52 is joined pivotally to the chassis 9 with a pin 52a. One end of the lever 52 is joined pivotally to one end of the control plate 13, while the other end thereof is provided with a pin 52b slidably fitted in the cam groove 35a of the positive motion cam 35 so as to function as a follower. The position of the pin 52b of the lever 52 and that of the pin 34c of the sector gear 34 are decide so that one of the pins 52b and 34c is located in either the inner groove 35c or the outer groove 35d, when the other is located in the connecting groove 35e.

The manner of operation of the driving mechanism thus constituted according to the present invention will be described hereinafter.

When empty, the cassette holder 1 is located at a position corresponding to the upper portions of the side plates 9a as illustrated in FIG. 14, while the pinion 43 and the first cassette holder transfer gear 41 are engaged as illustrated in FIG. 17. In this state, the loading point 49a of the torsion coil spring 49 on the reversing lever 48 is located on the side of the first loading gear 35b with respect to a straight line passing the loading point 49b of the torsion coil spring 49 on the swing arm 42 and the pivotal pin 42a of the swing arm 42 as illustrated in FIG. 17; consequently, the pinion 43 and the first cassette holder transfer gear 41 are engaged securely by the resilient force of the torsion coil spring 49.

When the control button, not shown, is operated after inserting the tape cassette into the cassette holder 1, the reversible motor 3 starts running in the normal direction to rotate the idle wheel 44 through the worm 47, the worm wheel 46 and the idle wheel 45, and thereby the pinion 43 fixed to the shaft of the idle wheel 44 is rotated in a counterclockwise direction. The normal running direction of the reversible motor 3 corresponds to a direction of rotation for rotating the pinion 43 in a counterclockwise direction as viewed in FIG. 17.

As the pinion 43 is rotated in a counterclockwise direction, the first cassette holder transfer gear 41 engaging the pinion 43 and the second cassette transfer gear 40 combined with the former rotate in a clockwise direction, and thereby the third cassette holder transfer gear 38 engaging the second cassette holder transfer gear 40 is rotated in a counterclockwise direction. Since the third cassette holder transfer gear 38 and the rack 37 fixed to the sliding plate 36 are engaged, the sliding plate 36 is moved in a direction indicated by an arrow Q (referred to as "Q-direction" hereinafter) in FIG. 17 as the third cassette holder transfer gear 38 is rotated in a counterclockwise direction, and hence the sliding plate 36' interlocked with the sliding plate 36 through the connecting arms 36f and 36g is moved in the same direction. Accordingly, the cassette holder 1 having the pins 1a slidably fitted in the inclined slots 36a formed in the sliding plates 36 and 36' is moved in the same direction, namely, in the P-direction as viewed in FIG. 14 to transfer the cassette holder 1 to the operating position.

During this process for transferring the cassette holder 1, the cassette holder 1 is moved horizontally in the P-direction (FIG. 14) while the pins 1a move in the respective horizontal sections of the L-shaped slots 9b formed in the side plates 9a, respectively; and the cassette holder 1 is moved vertically downward after the pins 1a have entered the respective vertical sections of the L-shaped slots 9a, because the pins 1a move downward along the vertical sections as the pins 1a slide along the inclined slots 36a of the sliding plates 36 and 36', respectively. At the end of the downward movement of the cassette holder 1, the supply reel shaft 10 and the winding reel shaft 11 are received in the reels of the tape cassette 2 and the sliding plates 36 and 36' are stopped.

Simultaneously with the completion of the cassette holder transferring motion of the sliding plates 36 and 36', the projection 36d projecting from the sliding plate 36 engages the bent portion 51a of the stopping lever 51 to turn the stopping lever 51 counterclockwise as viewed in FIG. 17, and thereby the projection 51b of the stopping plate 51 is moved into the recess 36e of the sliding plate 36 to check the movement of the sliding plate 36 in a direction opposite the Q-direction as viewed in FIG. 17. The counterclockwise turning of the stopping plate 51 moves the connecting plate 50 in a direction opposite the Q-direction (FIG. 17), and thereby the reversing lever 48 is turned counterclockwise. Consequently, the loading point 49a of the torsion spring 49 on the reversing lever 48 moves over the straight line passing the pin 42a of the swing arm 42 and the loading point 49b of the torsion coil spring 49 on the swing arm 42 to a position on the side of the first cassette holder transfer gear 41, and thereby the pinion 43 and the first loading gear 35b are engaged by the resilient force of the torsion coil spring 49.

Since the pinion 43 is rotating counterclockwise, the positive motion cam 35 incorporating the first loading gear 35b engaging the pinion 43 is rotated clockwise. However, when the reversing lever 48 is not turned counterclockwise, the finger 48b of the reversing lever 48 is in engagement with the free end of the arm of the sector gear 34 and the pin 34c attached to the free end of the arm is located in the cam groove 35a. Therefore, the positive motion cam 35 is unable to rotate. When the reversing lever 48 is turned counterclockwise to engage the pinion 43 and the first loading gear 35b, the positive motion cam 35 is turned clockwise as viewed in FIG. 17. As the positive motion cam 35 is turned clockwise, the connecting groove 35e of the cam groove 35a moves the pin 34c of the sector gear 34 to turn the sector gear 34 counterclockwise on the pin 34b to a position shown in FIG. 18. The counterclockwise turning of the sector gear 34 causes the arm 27 provided with the third loading gear 31 engaging the second loading gear 34a of the sector gear 34 to turn clockwise as viewed in FIG. 15 so that the torsion coil spring 30 pushes the connecting arms 28 and 29. Consequently, the loading blocks 4 and 5 supported on the connecting arms 28 and 29 are moved upward along the guide slots 25 and 26 as far as the loading blocks 4 and 5 are stopped by the stoppers 32 and 33, respectively. The torsion coil spring 30 presses the loading blocks 4 and 5 against the stoppers 32 and 33, respectively, for loading the tape 6.

Figure 1:
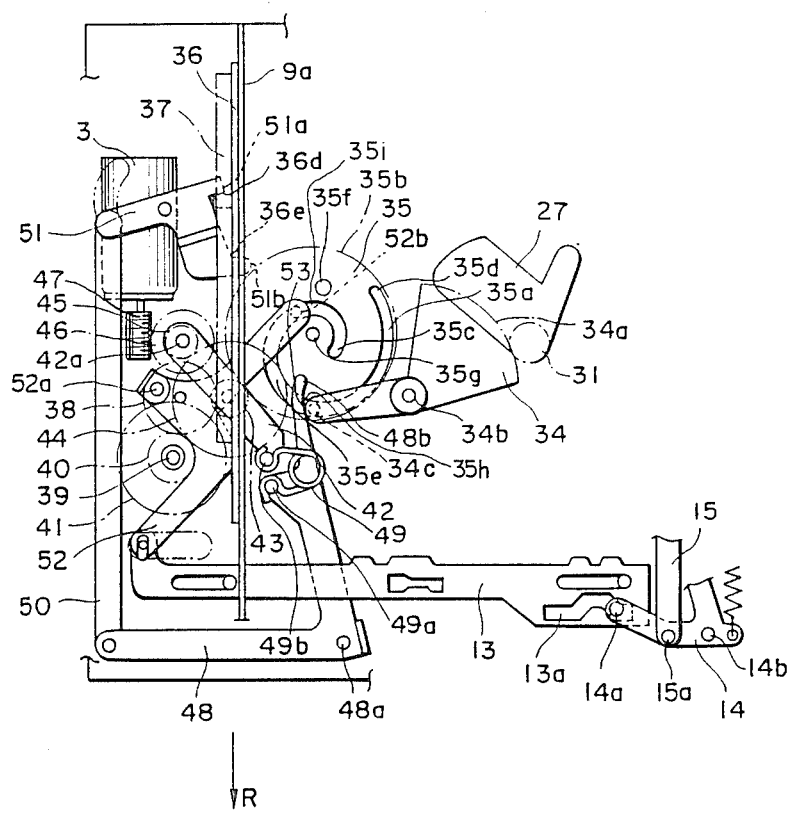
FIG. 1 is a schematic plan view of an essential portion of a VTR incorporating a driving mechanism according to the present invention.
Figure 18:
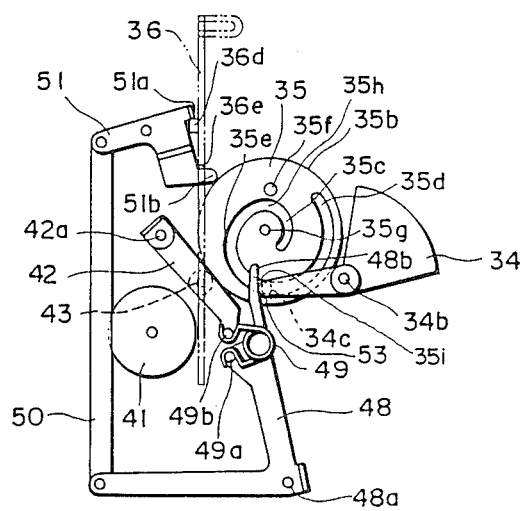

FIGS. 1, 2 and 18 illustrate the relative position of the components of the driving mechanism after the completion of a series of operations for loading the tape 6. The positive motion cam 35 is turned further in a clockwise direction as viewed in FIG. 1. Consequently, the connecting groove 35e of the cam groove 35a moves the pin 52b of the lever 52 to turn the lever 52 counterclockwise on the pin 52a as viewed in FIG. 1. Consequently, the control plate 13 joined pivotally to the lever 52 is moved rightward as viewed in FIG. 1 to press the pinch roller 7 against the capstan 8. Then, the reversible motor 3 is stopped.

While the lever 52 is turned, the pin 34c of the sector gear 34 is located in the outer groove 35d of a circular arc of the cam groove 35a, the sector gear 34 remains stationary. On the other hand, while the pin 34c of the sector gear 34 is located in the connecting groove 35e and the sector gear 34 is turned, the pin 52b of the lever 52 is located in the inner groove 35c of the cam groove 35a, hence, the lever 52 remains stationary. That is, before the insertion of the tape cassette 2, the pin 34c of the sector gear 34 is located in the vicinity of the junction 35h of the inner groove 35c and the connecting groove 35e of the cam groove 35a, while the pin 52b of the lever 52 is located near the end of the inner groove 35c. During the recording operation or the reproducing operation, the pin 34c is located near the end of the outer groove 35d of the cam groove 35a, while the pin 52b is located in the vicinity of the junction 35i of the outer groove 35d and the connecting groove 35e.

When an eject button, not shown, is operated, the reversible motor 3 starts running in the reverse direction to unload the tape 6 and to eject the tape cassette 2 outside the VTR. When the reversible motor 3 runs in the reverse direction, the pinion 43 is rotated clockwise. Since the positive motion cam 35 is turned counterclockwise, as viewed in FIG. 1, when the pinion 43 is rotated clockwise, first, the control plate 13 which has been moved to the right end position is moved leftward to a position shown in FIG. 1, and thereby the pinch roller 7 is separated from the capstan 8. Then, the sector gear 34 is turned clockwise, as viewed in FIG. 1, to turn the arm 27 counterclockwise for unloading operation. Upon the completion of the unloading operation, the stopper 35f of the positive motion cam 35 pushes the finger 48b of the reversing lever 48 to turn the reversing lever 48 clockwise as viewed in FIG. 1. The free end of the arm of the sector gear 34 has been retracted from the path of the reversing lever 48 before the reversing lever 48 is turned clockwise. When the reversing lever 48 is turned, the loading point 49a of the torsion coil spring 49 moves over the straight line passing the pin 42a of the swing arm 42 and the loading point 49b of the torsion coil spring 49 to a position on the side of the positive motion cam 35. Consequently, the pinion 43 is caused to engage the first cassette holder transfer gear 41 by the torsion coil spring 49. In addition, when the reversing lever 48 is turned clockwise, the connecting plate 50 turns the stopping lever 51 clockwise as viewed in FIG. 1 to retract the projection 51b of the stopping lever 51 from the recess 36e of the sliding plate 36, so that the sliding plate 36 becomes movable. Then, as the pinion 43 rotates clockwise, the third cassette holder transfer gear 38 rotates clockwise to move the sliding plate 36 incorporating the rack 37 engaging the third cassette holder transfer gear 38 in a direction indicated by an arrow R (referred to as "R-direction" hereinafter) in FIG. 1. Consequently, the tape cassette 2 is ejected through the inversion of a series of the above-mentioned operations for inserting the tape cassette 2; the cassette holder 1 is moved vertically, and then horizontally to eject the tape cassette 2 outside the VTR.

As apparent from the foregoing description, since the driving mechanism according to the present invention comprises: a plate cam as a driver having a cam groove consisting of two grooves having the shapes of circular arcs of different radiuses with the centers at the axis of rotation of the plate cam, respectively, and a connecting groove interconnecting those two grooves; two followers interlocked with the driver; the lengths of the two grooves having the shapes of circular arcs being decided so that one of the followers engages the connecting groove while the other follower engages the groove having a greater radius than the other or the groove having a smaller radius than the other, and the former follower engages the groove having a greater radius than the other or the groove having a smaller radius than the other while the latter follower engages the connecting groove; the followers being operatively interlocked with individual members, respectively, and the driver being rotated with suitable power means, the component members of the driving mechanism are driven for the loading operation, the unloading operation, the engagement of the pinch roller with the capstan and the disengagement of the pinch roller from the capstan by only a single motor. Accordingly, the present invention enables constructing a compact and lightweight VTR at a low cost. Furthermore, since the plate cam, namely, the driver, is a positive motion cam having a cam groove, the pinch roller is pressed against the capstan surely after the completion of the loading operation and the unloading operation is started surely after the pinch roller is separated from the capstan. Still further, since the cam groove consists of two grooves having the shapes of different circular arcs, respectively, and a connecting groove interconnecting those two grooves, the positive motion cam can be manufactured through a simple process, which further reduces the manufacturing cost of the VTR, Although the invention has been described in its preferred form with a certain degree of particularity, it is to be understood that many variations and changes in the invention are possible without departing from the scope and spirit thereof.

What is claimed is:

1. In a cassette tape recorder having a chassis, means for inserting a tape cassette in the chassis, a recorder head, tape loading means for loading tape from the cassette around the recorder head, pinch roller means for driving the tape by engaging it against a capstan, cam means connected to the tape loading means and to the pinch roller means for operating each of them, respectively, and a single reversible motor in the chassis providing a power output to rotate the cam means in a forward direction for sequentially driving the tape loading means to load the tape around the recorder head and drive the pinch roller means to engage the tape, and in a reverse direction sequentially to disengage the pinch roller means from the tape and unload the tape from the recorder head, the improvement wherein said cam means comprises:

- a pivotable first lever connected to the pinch roller means for operating it to engage the tape when said first lever is pivoted in a forward direction, and to disengage from the tape when said first lever is pivoted in a reverse direction;
- a pivotable second lever connected to the tape loading means for operating it to load the tape from the cassette around the recording head when said second lever is pivoted in a forward direction, and to unload the tape from around the recording head back into the cassette when said second lever is pivoted in a reverse direction;
- a rotatable positive motion cam (35) having a single groove formed in one plane therein including an outer circular arc section, an inner circular arc section, and a connecting arc section extending smoothly from the outer circular arc section to the inner circular arc section, the outer and inner circular arcs respectively having a larger and a smaller radius and being concentric with the rotation axis of the cam, and the connecting arc section being shaped to extend from the smaller to the larger radius; and
- said first lever having a member slidably engaged in said groove so as to run forward along the inner circular arc section to the connecting arc section and said second lever having a member slidably engaged in said groove so as to run forward along the connecting arc section to the outer circular arc section, when said cam is rotated in a forward direction, and vice versa in reverse when said cam is rotated in the reverse direction,
- whereby when said cam is rotated in the forward direction, said first lever member transverse the inner circular arc section at the same time as said second lever member traverse the connecting arc section, said first lever is not pivoted and the pinch roller means is not engaged and said second lever is pivoted in the forward direction and the tape loading means is operated to load the tape, and when said first lever member transverses the connecting arc section at the same time as said second lever member transverses the outer circular arc section, said first lever is pivoted in the forward direction and the pinch roller means is engaged and said second lever is not pivoted and the tape remains loaded, and
- whereby when said cam is rotated in the reverse direction, said first lever member traverses in reverse the connecting arc section at the same time as said second lever member traverses the outer circular arc section, said first lever is pivoted in the reverse direction and the pinch roller means is disengaged and said second lever is not pivoted and the tape remains loaded, and when said first lever member traverses in reverse the inner circular arc section at the same time as said second lever member traverses the connecting arc section, said first lever is not pivoted and the pinch roller means remains disengaged and said second lever is pivoted in the reverse direction and the tape loading means is operated to unload the tape.

* * * * *

UNITED STATES PATENT AND TRADEMARK OFFICE
CERTIFICATE OF CORRECTION

PATENT NO. : 4,752,845
DATED : June 21, 1988
INVENTOR(S) : SHOJI SUZUKI

It is certified that error appears in the above-identified patent and that said Letters Patent is hereby corrected as shown below:

Claim 1, Col.10, line 9, delete "transverse" and insert --traverses--;

Claim 1, Col. 10, line 11, delete "traverse" and insert --traverses--;

Claim 1, Col. 10, line 16, delete "transverses" and insert --traverses--;

Claim 1, Col. 10, line 18, delete "transverses" and insert --traverses--.

Signed and Sealed this

Thirteenth Day of December, 1988

*Attest:*

DONALD J. QUIGG

*Attesting Officer*      *Commissioner of Patents and Trademarks*